(12) United States Patent
Garanger et al.

(10) Patent No.: US 12,534,229 B2
(45) Date of Patent: Jan. 27, 2026

(54) POLYHEDRAL ROTORCRAFT MODULES FOR MODULAR AIRCRAFT

(71) Applicant: Georgia Tech Research Corporation, Atlanta, GA (US)

(72) Inventors: Kevin Pierre Garanger, Atlanta, GA (US); Jeremy Epps, Mechanicsville, VA (US); Eric Marie J Feron, Marietta, GA (US); Thanakorn Khamvilai, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 18/160,093

(22) Filed: Jan. 26, 2023

(65) Prior Publication Data
US 2023/0234726 A1 Jul. 27, 2023

Related U.S. Application Data

(60) Provisional application No. 63/303,205, filed on Jan. 26, 2022.

(51) Int. Cl.
*B64U 10/13* (2023.01)
*B64U 10/70* (2023.01)
*B64U 30/299* (2023.01)
*B64U 101/60* (2023.01)

(52) U.S. Cl.
CPC ............ *B64U 10/13* (2023.01); *B64U 10/70* (2023.01); *B64U 30/299* (2023.01); *B64C 2211/00* (2013.01); *B64U 2101/60* (2023.01); *B64U 2201/20* (2023.01)

(58) Field of Classification Search
CPC .... B64U 20/40; B64U 2101/60; B64U 10/13; B64U 10/70; B64U 30/299
See application file for complete search history.

(56) References Cited

U.S. PATENT DOCUMENTS

| | | | |
|---|---|---|---|
| 2018/0186450 A1* | 7/2018 | Chang | B64C 37/02 |
| 2019/0072953 A1* | 3/2019 | Maheshwari | B64U 40/20 |
| 2020/0130795 A1* | 4/2020 | Fikes | B63G 8/39 |
| 2021/0163122 A1* | 6/2021 | Kawakami | B64D 47/08 |
| 2021/0339845 A1* | 11/2021 | Milan | B64U 30/299 |
| 2022/0380044 A1* | 12/2022 | Arnold | B64D 47/08 |

* cited by examiner

*Primary Examiner* — Joshua D Huson
*Assistant Examiner* — Peter A Taraschi
(74) *Attorney, Agent, or Firm* — TROUTMAN PEPPER LOCKE LLP; Ryan A. Schneider; Brandon M. Reed

(57) ABSTRACT

A modular and reconfigurable aircraft including a first aircraft module, a second aircraft module, a plurality of connectors, and a coupler. The first aircraft module can include a polyhedral cage structure, a propeller disposed in an interior of the polyhedral cage structure, and a motor disposed in the interior of the polyhedral cage structure and configured to drive the propeller. The second aircraft module can include a polyhedral cage structure, a propeller disposed in the interior of the polyhedral cage structure, and a motor disposed in the interior of the polyhedral cage structure and configured to drive the propeller. A plurality of connectors can be configured to couple the polyhedral cage structure of the first aircraft module to the polyhedral cage structure of the second aircraft module. A coupler can be configured to attach a payload to the polyhedral cage structure of the first aircraft module.

6 Claims, 10 Drawing Sheets

700

- 701: Couple A plurality of aircraft modules to form the modular aircraft, wherein coupling the plurality of aircraft modules comprises attaching each polyhedral cage structure of an aircraft module in the plurality of aircraft modules to at least one polyhedral cage structure of another aircraft module in the plurality of aircraft modules
- 702: Attaching A payload to the modular aircraft at a first point
- 703: Controlling the motor of at least one of the plurality of aircraft modules to compensate for A moment induced by the payload to maintain an orientation of the modular aircraft
- 704: Arranging the plurality of aircraft modules such that control of the modular aircraft is maintained upon a failure of at least one motor of the plurality of aircraft modules
- 705: Remotely piloting the modular aircraft to a target site
- 706: Employing an end effector at the target site
- 707: Attaching a second payload to a second portion of the modular aircraft
- 708: Splitting the modular aircraft into two or more smaller modular aircrafts

FIG. 7

POLYHEDRAL ROTORCRAFT MODULES FOR MODULAR AIRCRAFT

CROSS-REFERENCE TO RELATED APPLICATIONS

This application claims the benefit of U.S. Provisional Application Ser. No. 63/303,205, filed on 26 Jan. 2022, which is incorporated herein by reference in its entirety as if fully set forth below.

FIELD OF THE DISCLOSURE

The various embodiments of the present disclosure relate generally to rotorcraft, and more particularly to modular and versatile multi-rotor aircraft systems.

BACKGROUND

Modular robotic systems employ a group of compatible autonomous components, which, through interactions between components, hardware redundancy, and reconfiguration capabilities, promise to offer increased versatility and robustness over other robotic systems. These promises and the rapid development of Unmanned Air System (UAS) technologies have triggered investigations regarding the feasibility of autonomous modular aerial vehicles.

Current applications for UAS include mapping, surveying, inspection, delivery, filming, photography, spraying, and seeding. Operators for these applications can have large fleets of different UAS with a variety of payloads that span a range of weights and dimensions. These large fleets can lead to inefficiencies of maintenance, as it is inherently more costly and labor intensive to maintain a fleet consisting of varied UAS having distinct parts and maintenance schedules.

Many current UAS require the UAS to perform translational motion and position stabilization by tilting its airframe, which makes them ill-suited for carrying/delivering payloads which need to remain at a constant orientation and for adjusting on-the-fly for forces and moments induced by the payload, for example, the delivery of a package or the spraying of a fluid.

Additionally, many current UAS have minimal fault tolerance and can lose control in one or more directions due to the failure of one subcomponent such as a rotor. These UAS can also struggle to maintain attitude control in inclement weather.

Modular UAS have the advantages of reduced cost, superior maneuverability, and increased fault tolerance.

BRIEF SUMMARY

The present disclosure relates to aircraft modules, such as those for use in a modular, reconfigurable multi-purpose aircraft. An exemplary embodiment of the present disclosure provides an aircraft module including a polyhedral cage structure and a propeller disposed in an interior of the polyhedral cage structure.

In any of the embodiments disclosed herein, the aircraft module can further include: a plurality of connectors disposed on the cage structure and configured to couple the aircraft module to an adjacent aircraft module, a motor disposed in the interior of the polyhedral cage structure and configured to drive the propeller, a power source configured to provide electric power to the motor, and a controller configured to drive the motor and control flight of the aircraft module.

In any of the embodiments disclosed herein, the aircraft module can further include a coupler configured to removably attach a payload to the polyhedral cage structure.

In any of the embodiments disclosed herein, the polyhedral cage structure can include a dodecahedral cage structure.

An exemplary embodiment of the present disclosure provides a modular and reconfigurable aircraft including a first aircraft module, a second aircraft module, a plurality of connectors, and a coupler. The first aircraft module can include a polyhedral cage structure, a propeller disposed in an interior of the polyhedral cage structure, and a motor disposed in the interior of the polyhedral cage structure and configured to drive the propeller. The second aircraft module can include a polyhedral cage structure, a propeller disposed in the interior of the polyhedral cage structure, and a motor disposed in the interior of the polyhedral cage structure and configured to drive the propeller, a plurality of connectors configured to couple the polyhedral cage structure of the first aircraft module to the polyhedral cage structure of the second aircraft module. The coupler can be configured to attach a payload to the polyhedral cage structure of the first aircraft module.

In any of the embodiments disclosed herein, the first aircraft module and the second aircraft module can be coupled such that the propeller of the first aircraft module and the propeller of the second aircraft module are noncoplanar.

In any of the embodiments disclosed herein, the first aircraft module and the second aircraft module can be coupled such that an axis of rotation of the propeller of the first aircraft module and an axis of rotation of the propeller of the second aircraft module are non-coaxial.

In any of the embodiments disclosed herein, the aircraft can further include a controller configured to control the drive the motor of the first aircraft module and the motor of the second aircraft module to compensate for a moment induced by the payload to maintain an orientation of the aircraft.

In any of the embodiments disclosed herein, the payload can include an end effector selected from the group including: an RGB camera, a hyperspectral camera, an infrared camera, a gas detector, a pellet spreader, a cargo container, a passenger transport pod, a LIDAR sensor, an ultrasonic sensor, a sprayer, a grasper, and a bucket.

In any of the embodiments disclosed herein, the polyhedral cage structure of the first aircraft module can include a dodecahedral cage structure and the polyhedral cage structure of the second aircraft module can include a dodecahedral cage structure. The first aircraft module and the second aircraft module can be coupled by matching all points of a face of the dodecahedral cage structure of the first aircraft module with all points of a face of the dodecahedral cage structure of the second aircraft module.

In any of the embodiments disclosed herein, the polyhedral cage structure of the first aircraft module can include a dodecahedral cage structure and the polyhedral cage structure of the second aircraft module can include a dodecahedral cage structure. The first aircraft module and the second aircraft module can be coupled by matching two points of a face of the dodecahedral cage structure of the first aircraft module with two points of a face of the dodecahedral cage structure of the second aircraft module.

In any of the embodiments disclosed herein, the aircraft can further include a third aircraft module and a fourth aircraft module. The third aircraft module can include a polyhedral cage structure, a propeller disposed in an interior of the polyhedral cage structure, and a motor disposed in the interior of the polyhedral cage structure and configured to drive the propeller. The fourth aircraft module can include a polyhedral cage structure, a propeller disposed in an interior of the polyhedral cage structure, and a motor disposed in the interior of the polyhedral cage structure and configured to drive the propeller.

In any of the embodiments disclosed herein, the aircraft modules can be configured such that an axis of rotation of the propeller of the first aircraft module and an axis of rotation of the propeller of the second aircraft module are parallel and an axis of rotation of the propeller of the third aircraft module and an axis of rotation of the propeller of the fourth aircraft module are parallel, and the propeller of the first aircraft module and the propeller of the third aircraft module rotate in a direction opposite that of the propeller of the second aircraft module and the propeller of the fourth aircraft module.

In any of the embodiments disclosed herein, the first, second, third, and fourth aircraft modules lie in a substantially flat configuration.

In any of the embodiments disclosed herein, the propeller of the first aircraft module and the propeller of the third aircraft module rotate in a direction opposite that of the propeller of the second aircraft module and the propeller of the fourth aircraft module, wherein the first, second, third, and fourth aircraft modules lie in a tetrahedral configuration.

An exemplary embodiment of the present disclosure provides a method of using a modular aircraft. The method can include coupling a plurality of aircraft modules to form the modular aircraft, wherein each aircraft module can include a polyhedral cage structure, a motor, and wherein coupling the plurality of aircraft modules can include attaching each polyhedral cage structure of an aircraft module in the plurality of aircraft modules to at least one polyhedral cage structure of another aircraft module in the plurality of aircraft modules.

In any of the embodiments disclosed herein, the method can further include attaching a payload to the modular aircraft at a first point, controlling the motor of at least one of the plurality of aircraft modules to compensate for a moment induced by the payload to maintain an orientation of the modular aircraft, and arranging the plurality of aircraft modules such that control of the modular aircraft is maintained upon a failure of at least one motor of the plurality of aircraft modules.

In any of the embodiments disclosed herein, the method can further include attaching a second payload to a second portion of the modular aircraft and splitting the modular aircraft into two or more smaller modular aircrafts.

In any of the embodiments disclosed herein, the method can further include remotely piloting the modular aircraft to a target site, and employing an end effector at the target site. The payload can include the end effector, and the end effector can be selected from the group including: an RGB camera, a hyperspectral camera, an infrared camera, a gas detector, a pellet spreader, a cargo container, a passenger transport pod. a LIDAR sensor, an ultrasonic sensor, a sprayer, a grasper, and a bucket.

In any of the embodiments disclosed herein, the plurality of aircraft modules can include four aircraft modules, and coupling the plurality of aircraft modules can further include arranging the plurality of aircraft modules in a tetrahedral configuration.

In any of the embodiments disclosed herein, coupling the plurality of aircraft modules can further include arranging the plurality of aircraft modules in a flat configuration.

In any of the embodiments disclosed herein, the coupling the plurality of aircraft modules can further include arranging the plurality of aircraft modules in a configuration such that for at least six aircraft modules the respective axis of rotation of the propeller of each of the six modules is not parallel with any of the other axes of rotation of the six aircraft modules.

In any of the embodiments disclosed herein, the method can further include navigating the modular aircraft in three dimensions along a path while keeping an attitude of the aircraft fixed and changing the attitude of the modular aircraft while maintaining a fixed position.

In any of the embodiments disclosed herein, the navigated path and attitude can be chosen independently.

In any of the embodiments disclosed herein, the method can further include attaching a payload to the modular aircraft wherein an orientation of the payload is fixed with respect to the aircraft and controlling the orientation of the payload with respect to a fixed reference frame by adjusting the attitude of the modular aircraft.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 7 provides a flow chart depicting a method of using a modular aircraft, in accordance with an exemplary embodiment of the present invention.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 1:
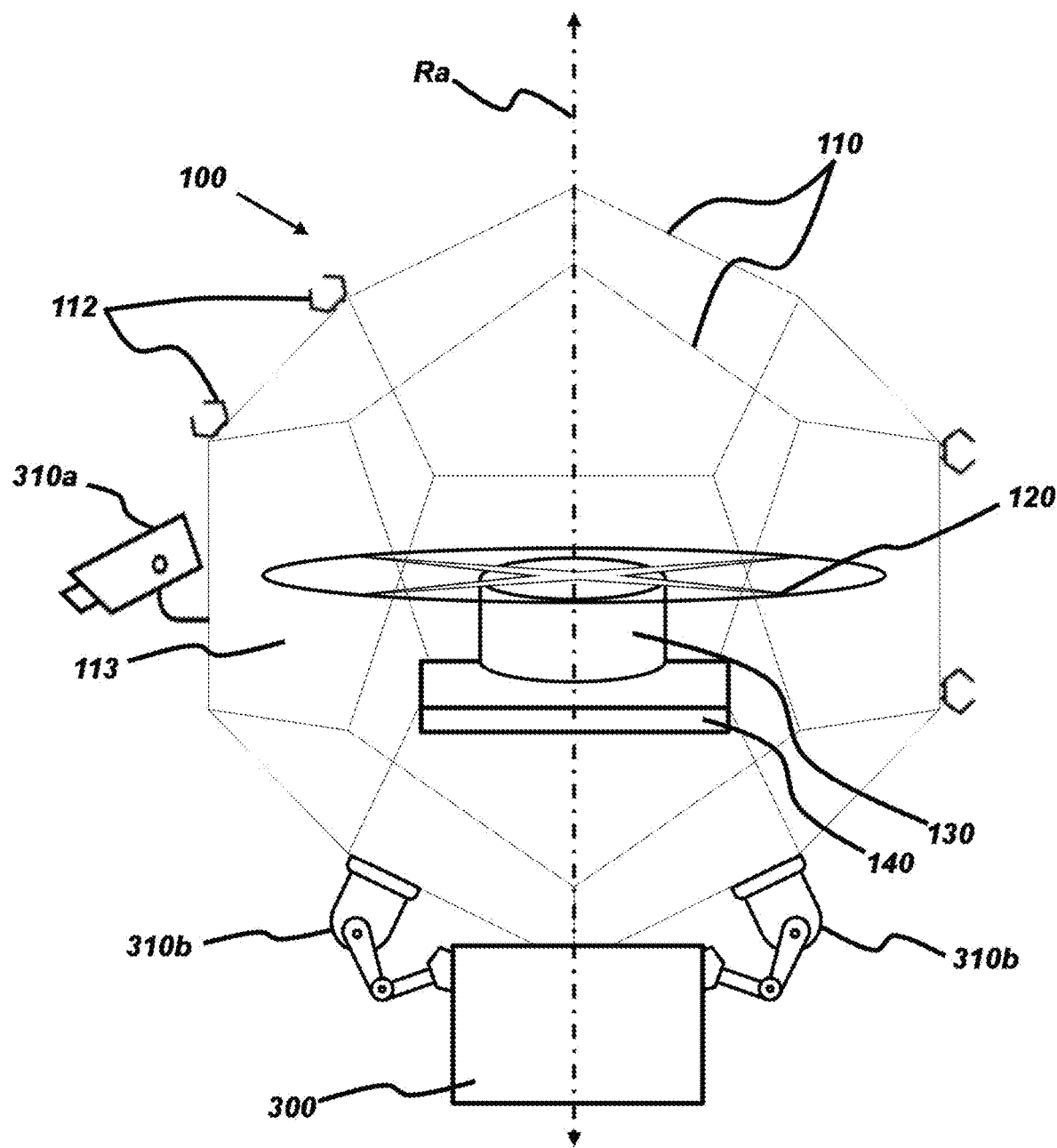
FIG. 1 provides a perspective view of an aircraft module, in accordance with an exemplary embodiment of the present invention.
Figure 2:
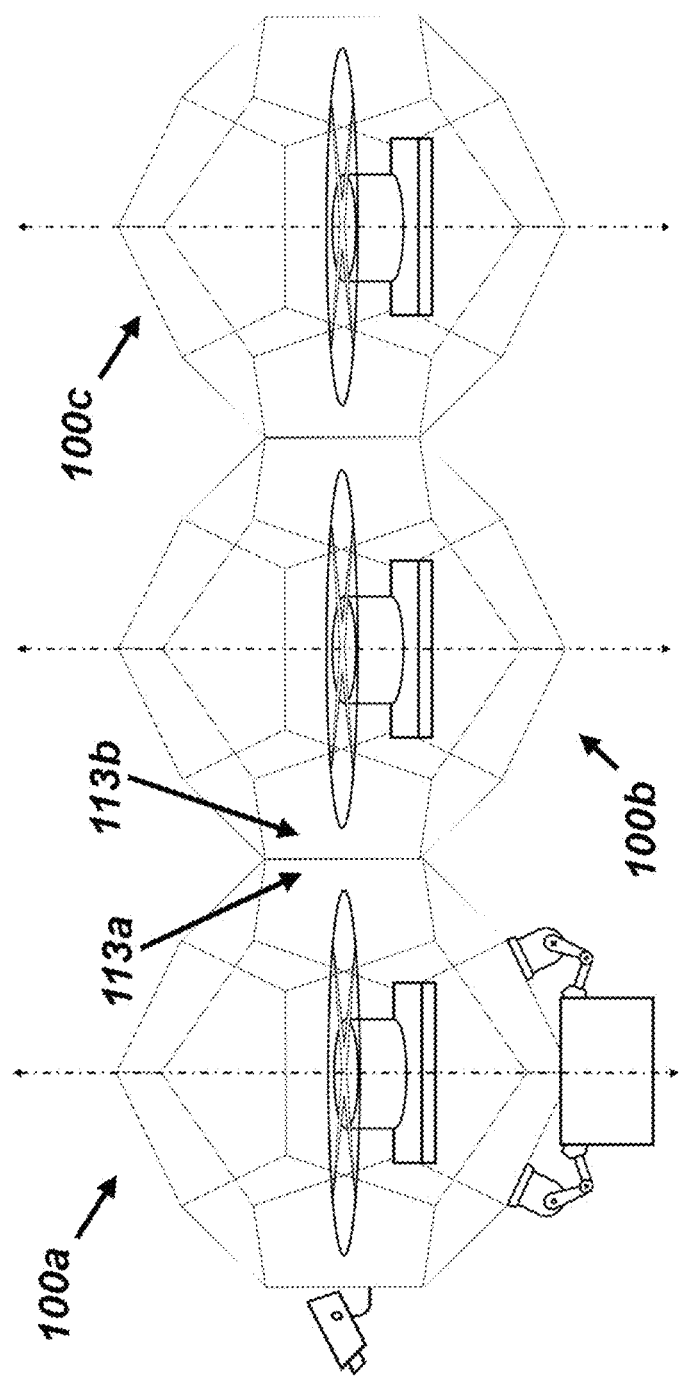
FIG. 2 provides a perspective view of a modular aircraft, in accordance with an exemplary embodiment of the present invention.

As shown in FIG. 1, an exemplary embodiment of the present invention provides an aircraft module 100 including a polyhedral cage structure 110 and a propeller 120 disposed in an interior 111 of the polyhedral cage structure 110.

In any of the embodiments disclosed herein, the aircraft module 100 can further include: a plurality of connectors 112 disposed on the cage structure 110 and configured to couple the aircraft module 100 to an adjacent aircraft module, a motor 130 disposed in the interior 111 of the polyhedral cage structure 110 and configured to drive the propeller 120, a power source 140 configured to provide electric power to the motor 130, and a controller 150 configured to drive the motor 130 and control flight of the aircraft module 100.

In any of the embodiments disclosed herein, the aircraft module 100 can further include a coupler 160 configured to removably attach a payload 300 to the polyhedral cage structure 110.

In any of the embodiments disclosed herein, the polyhedral cage structure 110 can include a dodecahedral cage structure 110.

As shown in FIGS. 2-6D, an exemplary embodiment of the present disclosure provides a modular and reconfigurable aircraft 200 including a first aircraft module, a second aircraft module, a plurality of connectors, and a coupler. The first aircraft module 100a can include a polyhedral cage structure 110a, a propeller 120a disposed in an interior 111 of the polyhedral cage structure 110a, and a motor 130 disposed in the interior 111a of the polyhedral cage structure 110a and configured to drive the propeller 120a. The second aircraft module 100b can include a polyhedral cage structure 110b, a propeller 120b disposed in the interior 111b of the polyhedral cage structure 110b, and a motor 130 disposed in the interior 111b of the polyhedral cage structure 110b and configured to drive the propeller 120b, a plurality of connectors 112 configured to couple the polyhedral cage structure 110a of the first aircraft module 100a to the polyhedral cage structure 110b of the second aircraft module 100b. The coupler 160 can be configured to attach a payload 300 to the polyhedral cage structure 110a of the first aircraft module 100a.

In any of the embodiments disclosed herein, coupling one aircraft module 100a to another 100b can be accomplished with temporary means such as clamps, clips, clasps, magnets, hook-and-loop, or the like, or with semi-permanent or permanent means such as screws, nuts/bolts, and the like.

Figure 3A:
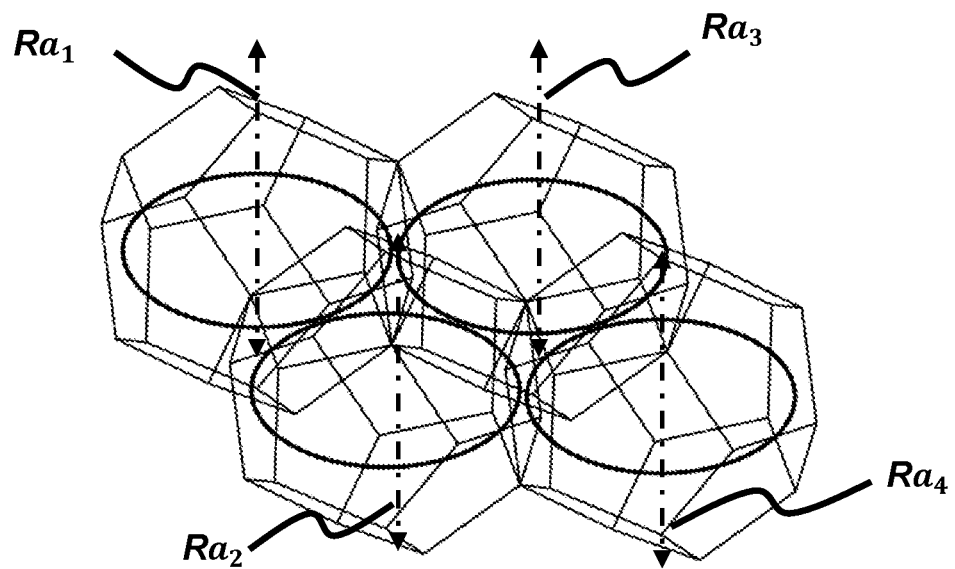
FIG. 3A provides a perspective view of a modular aircraft, in accordance with an exemplary embodiment of the present invention.
Figure 3B:
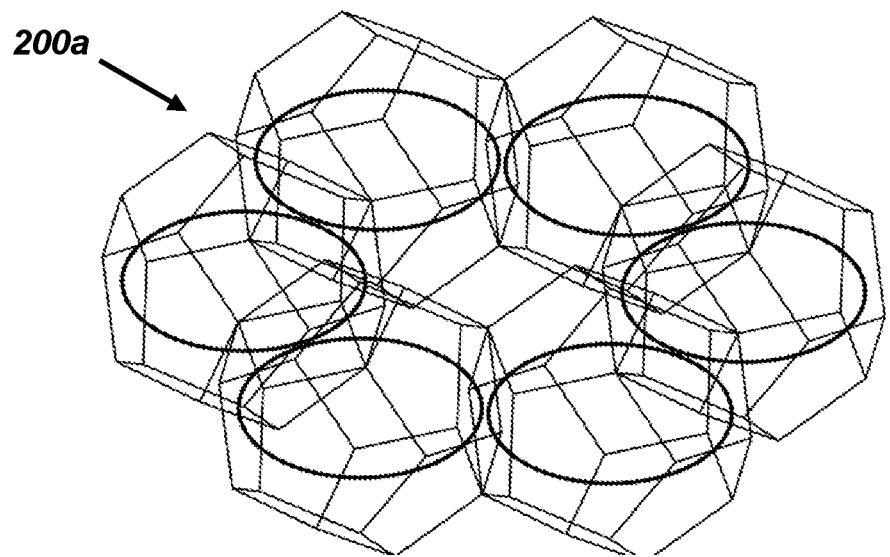
FIG. 3B provides a perspective view of a modular aircraft, in accordance with an exemplary embodiment of the present invention.
Figure 3C:
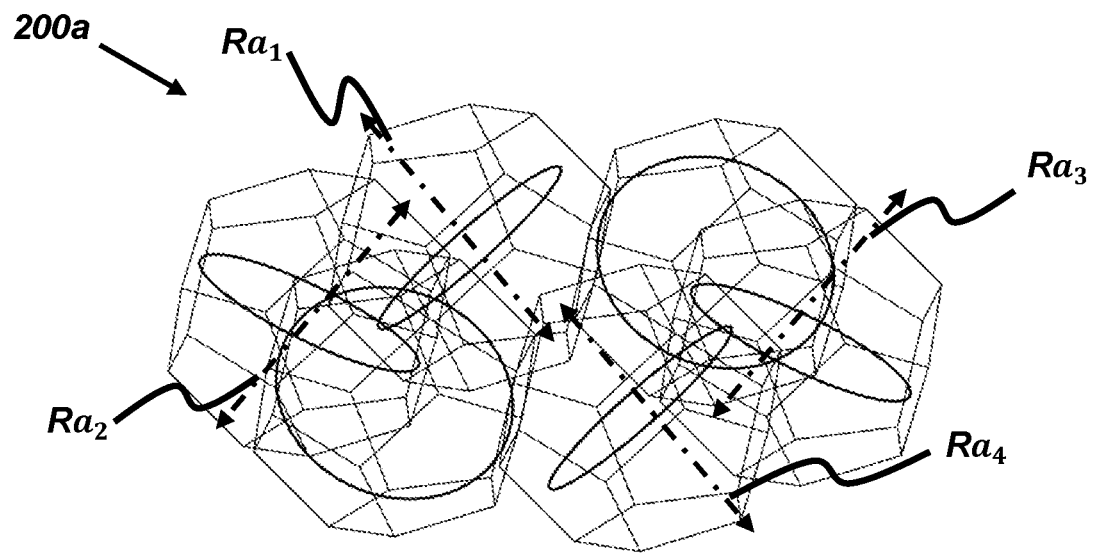
FIG. 3C provides a perspective view of a modular aircraft, in accordance with an exemplary embodiment of the present invention.
Figure 3D:
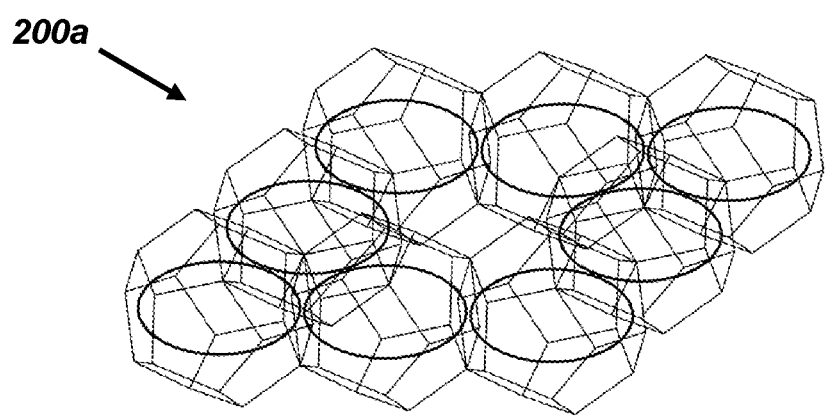
FIG. 3D provides a perspective view of a modular aircraft, in accordance with an exemplary embodiment of the present invention.

As shown in FIG. 3C, in any of the embodiments disclosed herein, the first aircraft module 100a and the second aircraft module 100b can be coupled such that the propeller 120a of the first aircraft module 100a and the propeller 120a of the second aircraft module 100b are noncoplanar.

In any of the embodiments disclosed herein, the first aircraft module 100a and the second aircraft module 100b can be coupled such that an axis of rotation of the propeller 120a of the first aircraft module 100a and an axis of rotation of the propeller 120b of the second aircraft module 100b are non-coaxial.

In any of the embodiments disclosed herein, the aircraft can further include a controller configured to control the drive the motor 130 of the first aircraft module 100a and the motor 130 of the second aircraft module 100b to compensate for a moment induced by the payload 300 to maintain an orientation of the aircraft.

In any of the embodiments disclosed herein, the payload 300 can include an end effector 310 selected from the group including: an RGB camera 310a, a hyperspectral camera, an infrared camera, a gas detector, a pellet spreader, a cargo container, a passenger transport pod. a LIDAR sensor, an ultrasonic sensor, a sprayer, a grasper 310b, and a bucket.

Figure 4A:
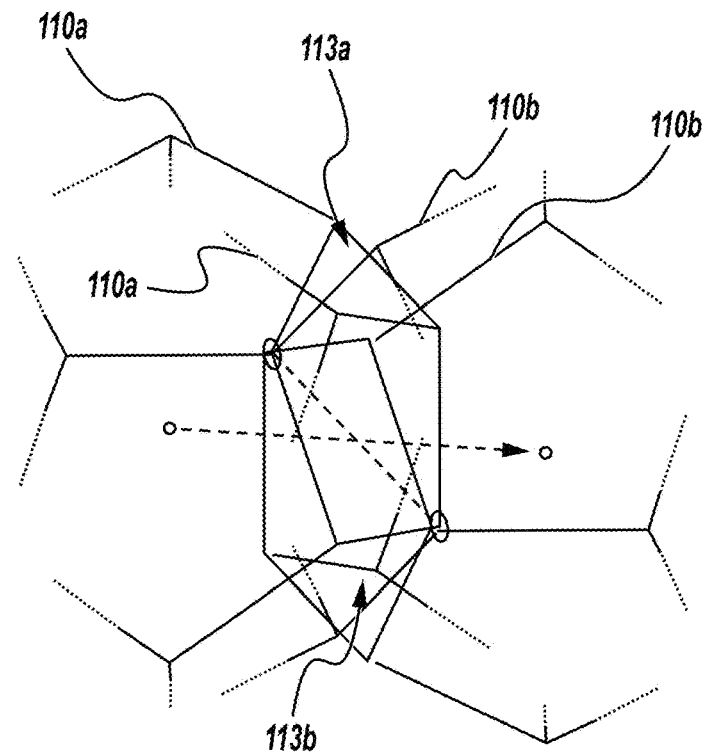
FIG. 4A provides an illustration of a first aircraft module coupled to a second aircraft module, in accordance with an exemplary embodiment of the present invention.
Figure 4B:
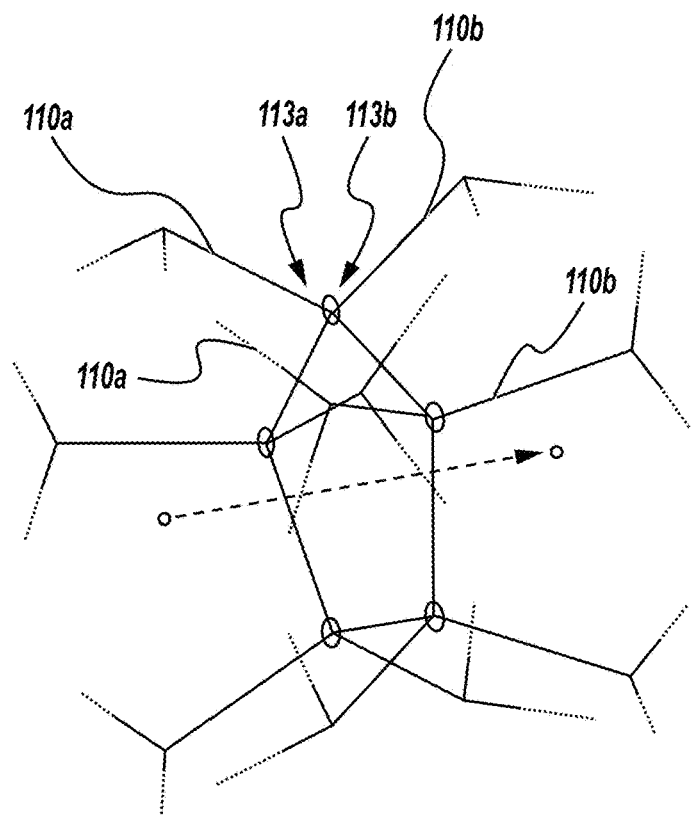
FIG. 4B provides an illustration of a first aircraft module coupled to a second aircraft module, in accordance with an exemplary embodiment of the present invention.

In any of the embodiments disclosed herein, the polyhedral cage structure 110a of the first aircraft module 100a can include a dodecahedral cage structure 110a and the polyhedral cage structure 110b of the second aircraft module 100b can include a dodecahedral cage structure 110b. As shown in FIG. 4B, the first aircraft module 100a and the second aircraft module 100b can be coupled by matching all points of a face 113a of the dodecahedral cage structure 110a of the first aircraft module 100a with all points of a face 113b of the dodecahedral cage structure 110b of the second aircraft module 100b.

In any of the embodiments disclosed herein, the polyhedral cage structure 110a of the first aircraft module 100a can include a dodecahedral cage structure 110a and the polyhedral cage structure 110b of the second aircraft module 100b can include a dodecahedral cage structure 110b. As shown in FIG. 4A, the first aircraft module 100a and the second aircraft module 100b can be coupled by matching two points of a face of the dodecahedral cage structure 110a of the first aircraft module 100a with two points of a face of the dodecahedral cage structure 110b of the second aircraft module 100b.

Figure 6A:
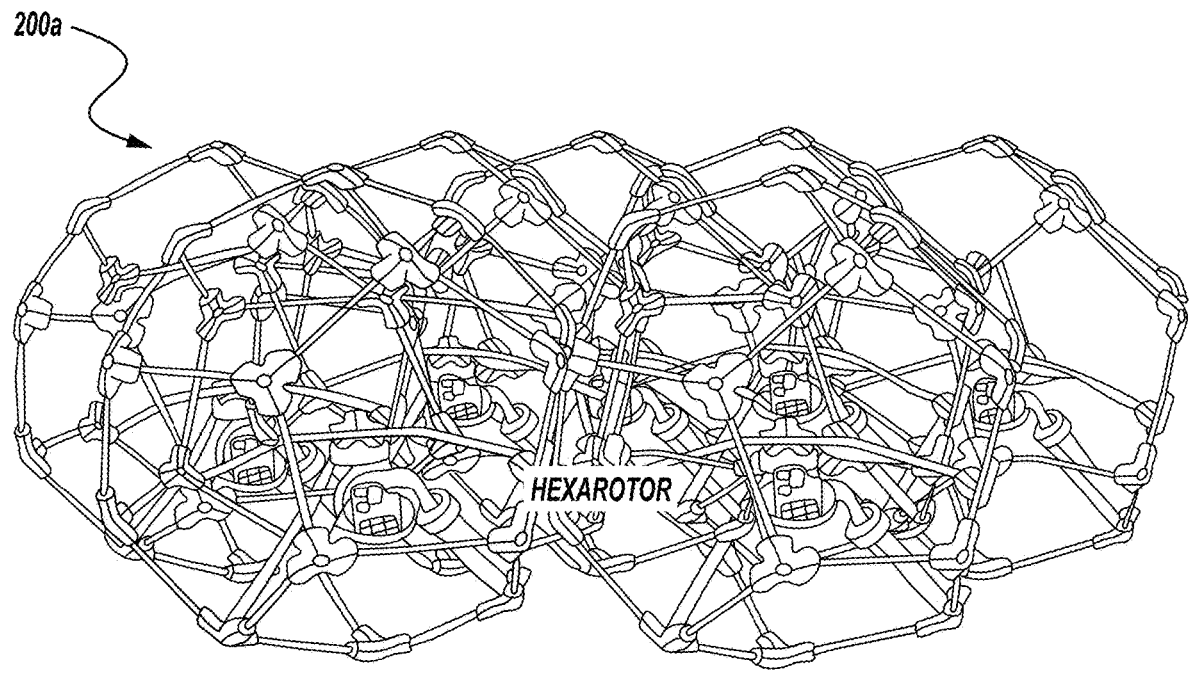
FIG. 6A provides an image of modular aircraft in a substantially flat configuration, in accordance with an exemplary embodiment of the present invention.
Figure 6B:
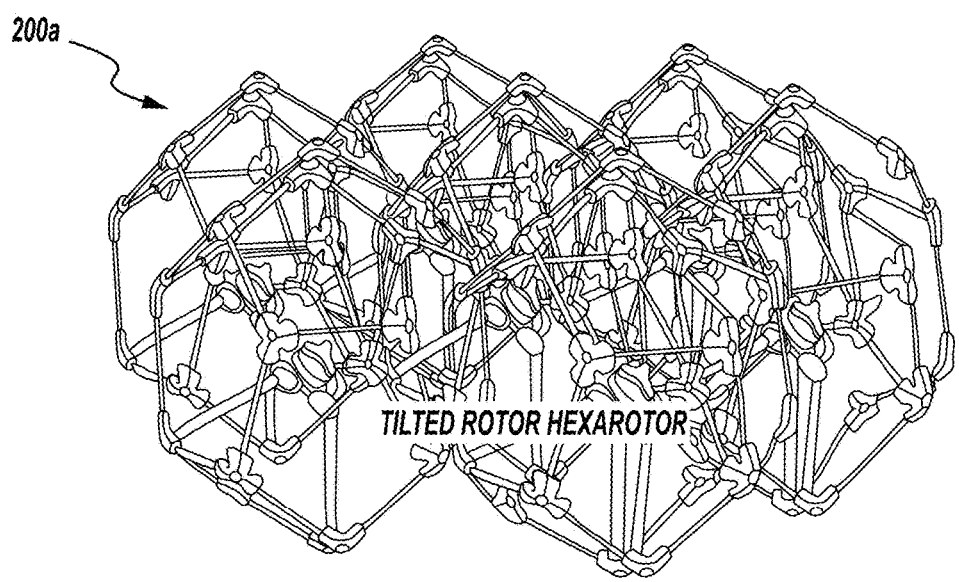
FIG. 6B provides an image of modular aircraft in a substantially flat configuration, in accordance with an exemplary embodiment of the present invention.
Figure 6C:
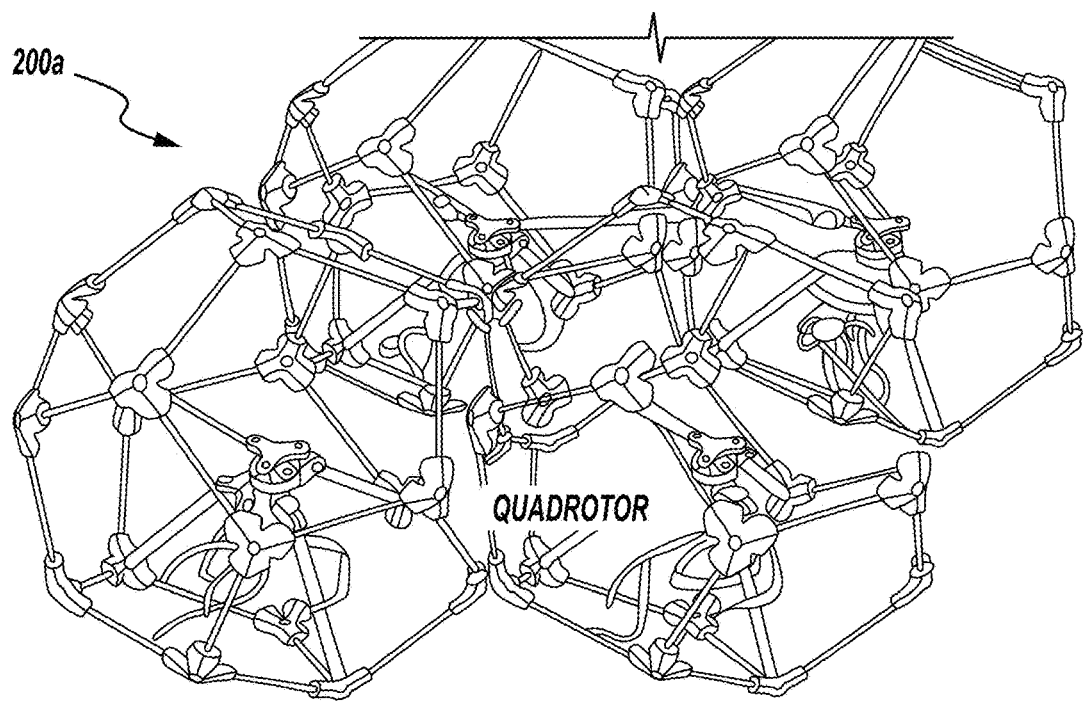
FIG. 6C provides an image of modular aircraft in a substantially flat configuration, in accordance with an exemplary embodiment of the present invention.
Figure 6D:
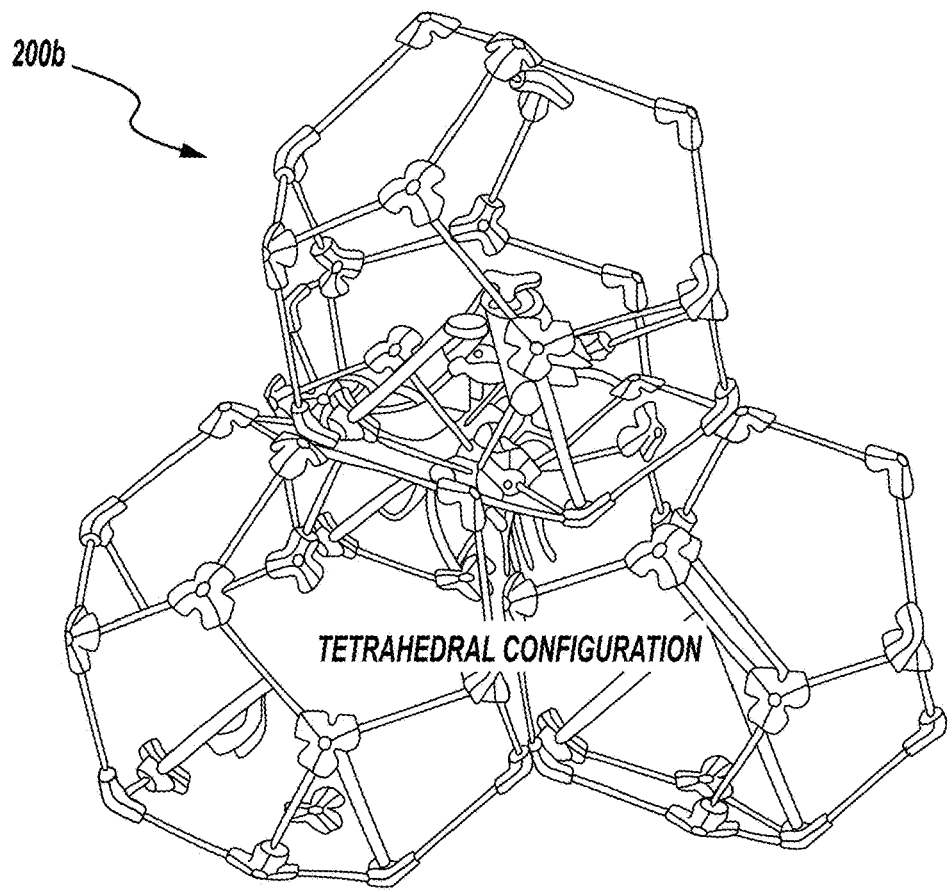
FIG. 6D provides an image of modular aircraft in a tetrahedral configuration, in accordance with an exemplary embodiment of the present invention.
Figure 8:
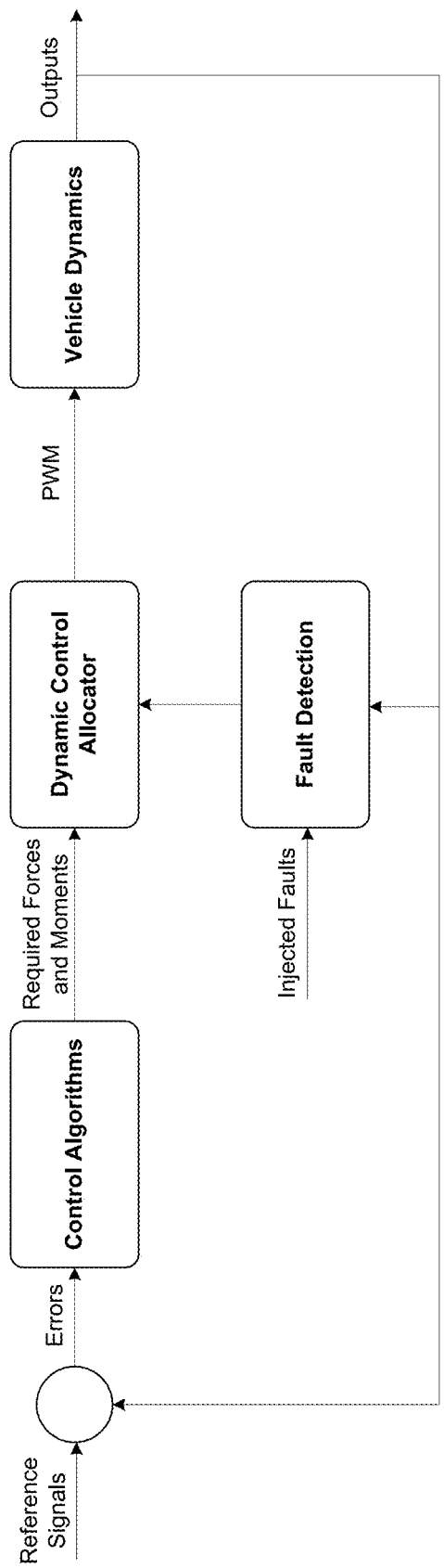
FIG. 8 provides a flow chart for a control scheme for a modular aircraft, in accordance with an exemplary embodiment of the present invention.

As shown in FIG. 6C-6D, in any of the embodiments disclosed herein, the aircraft can further include a third aircraft module 100c and a fourth aircraft module 100d. The third aircraft module 100c can include a polyhedral cage structure 110c, a propeller 120 disposed in an interior 111c of the polyhedral cage structure 110c, and a motor 130 disposed in the interior 111c of the polyhedral cage structure 110c and configured to drive the propeller 120. The fourth aircraft module 100d can include a polyhedral cage structure 110d, a propeller 120 disposed in an interior 111d of the polyhedral cage structure 110d, and a motor 130 disposed in the interior 111d of the polyhedral cage structure 110d and configured to drive the propeller 120.

As shown in FIGS. 6A-B, the modular aircraft 200 can include a fifth 100e and sixth 100f aircraft module configured similarly to the third 100c and fourth 100d aircraft modules described above.

Figure 5A:
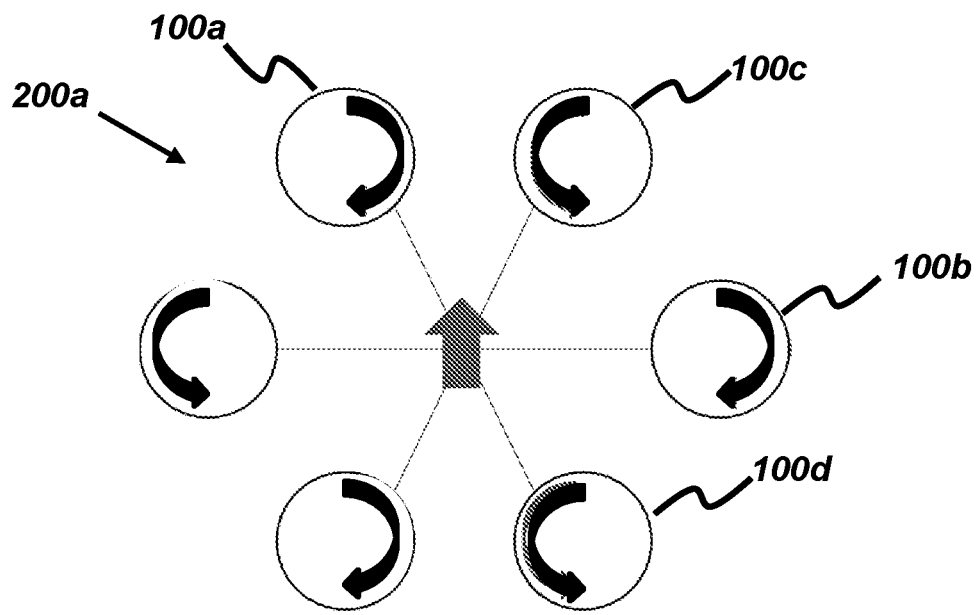
FIG. 5A provides a simplified illustration of a modular aircraft in a substantially flat configuration, in accordance with an exemplary embodiment of the present invention.
Figure 5B:
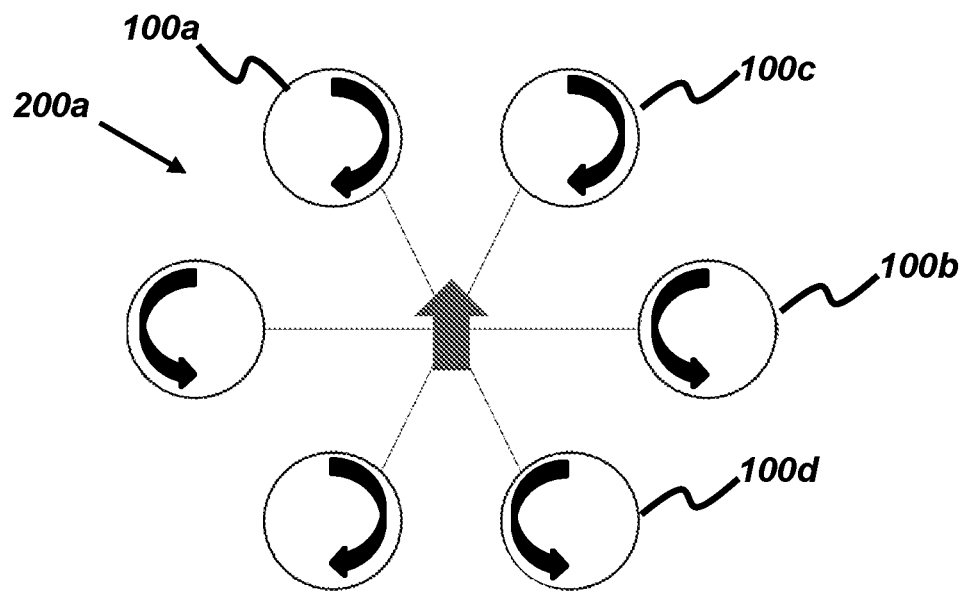
FIG. 5B provides a simplified illustration of a modular aircraft in a substantially flat configuration, in accordance with an exemplary embodiment of the present invention.

In any of the embodiments disclosed herein, the aircraft modules can be configured such that an axis of rotation of the propeller 120 of the first aircraft module 100a and an axis of rotation of the propeller 120 of the second aircraft module 100b are parallel and an axis of rotation of the propeller 120 of the third aircraft module 100c and an axis of rotation of the propeller 120 of the fourth aircraft module 100d are parallel, and the propeller 120 of the first aircraft module 100a and the propeller 120 of the third aircraft module 100c rotate in a direction opposite that of the propeller 120 of the second aircraft module 100b and the propeller 120 of the fourth aircraft module 100d as shown in FIG. 5B, in contrast to FIG. 5A.

In any of the embodiments disclosed herein, the first 100a, second 100b, third 100c, and fourth 100d aircraft modules lie in a substantially flat configuration 200a, as in any of FIGS. 5A-6C.

As shown in FIG. 6D, in any of the embodiments disclosed herein, the propeller 120 of the first aircraft module 100a and the propeller 120 of the third aircraft module 100c rotate in a direction opposite that of the propeller 120 of the second aircraft module 100b and the propeller 120 of the fourth aircraft module 100d, wherein the first 100a, second 100b, third 100c, and fourth 100d aircraft modules lie in a tetrahedral configuration 200b.

As shown in FIG. 7, an exemplary embodiment of the present disclosure provides a method of using a modular aircraft. The method can include coupling 701 a plurality of aircraft modules to form the modular aircraft, wherein each aircraft module can include a polyhedral cage structure, a motor, and wherein coupling the plurality of aircraft modules can include attaching each polyhedral cage structure of an aircraft module in the plurality of aircraft modules to at least one polyhedral cage structure of another aircraft module in the plurality of aircraft modules.

In any of the embodiments disclosed herein, the method can further include attaching 702 a payload to the modular aircraft at a first point, controlling 703 the motor of at least one of the plurality of aircraft modules to compensate for a moment induced by the payload to maintain an orientation of the modular aircraft, and arranging 704 the plurality of aircraft modules such that control of the modular aircraft is maintained upon a failure of at least one motor of the plurality of aircraft modules.

In any of the embodiments disclosed herein, the method can further include attaching 707 a second payload to a second portion of the modular aircraft and splitting 708 the modular aircraft into two or more smaller modular aircrafts.

In any of the embodiments disclosed herein, the method can further include remotely piloting 705 the modular aircraft to a target site, and employing 706 an end effector at the target site. The payload can include the end effector, and the end effector can be selected from the group including: an RGB camera, a hyperspectral camera, an infrared camera, a gas detector, a pellet spreader, a cargo container, a passenger transport pod. a LIDAR sensor, an ultrasonic sensor, a sprayer, a grasper, and a bucket.

In any of the embodiments disclosed herein, the plurality of aircraft modules can include four aircraft modules, and coupling the plurality of aircraft modules can further include arranging the plurality of aircraft modules in a tetrahedral configuration.

In any of the embodiments disclosed herein, coupling the plurality of aircraft modules can further include arranging the plurality of aircraft modules in a flat configuration.

In any of the embodiments disclosed herein, the coupling the plurality of aircraft modules can further include arranging the plurality of aircraft modules in a configuration such that for at least six aircraft modules the respective axis of rotation of the propeller of each of the six modules is not parallel with any of the other axes of rotation of the six aircraft modules. This results in the ability to vector the thrust of the aircraft in three dimensions while generating moments in arbitrary directions by adjusting the control of the propellers of the aircraft modules.

In any of the embodiments disclosed herein, the method can further include navigating the modular aircraft in three dimensions along a path while keeping an attitude of the aircraft fixed and changing the attitude of the modular aircraft while maintaining a fixed position.

In any of the embodiments disclosed herein, the navigated path and attitude can be chosen independently.

In any of the embodiments disclosed herein, the method can further include attaching a payload to the modular aircraft wherein an orientation of the payload is fixed with respect to the aircraft and controlling the orientation of the payload with respect to a fixed reference frame by adjusting the attitude of the modular aircraft.

The following examples further illustrate aspects of the present disclosure. However, they are in no way a limitation of the teachings or disclosure of the present disclosure as set forth herein.

Examples

The following table contains notations that are used throughout this section.

TABLE 1

| | Notations |
|---|---|
| i; j | Set of integers from i to j |
| $J._TK$ | Matrix transpose operation |
| $I_n$ | Identity matrix of size n × n |
| $0_{m \times n}$ | Matrix of size m × n with entries 0 |

TABLE 1-continued

Notations

| | |
|---|---|
| $1_{m \times n}$ | Matrix of size m × n with entries 1 |
| $0_n$ | Vector of size n with entries 0 |
| $1_n$ | Vector of size n with entries 1 |
| Im(.) | Image of a matrix |
| $\perp$ | Orthogonal complement of a linear subspace of $R^n$ equipped with the inner product |
| × | Cross-product in $R^3$ |
| SO(3) | 3D rotation group |
| so(3) | Set of skew-symmetric matrices of size 3 × 3 |
| [.]× | Application from $R^3$ to so(3) such that for all u, v ∈ $R^3$, [u] × v = u × v |
| int(.) | Interior of a set |
| $N(\mu, \Sigma)$ | Multivariate normal distribution of mean $\mu \in R^n$ and covariance $\Sigma \in R^{n \times n}$ |
| ;n − 1 | ;n − 1 J K |

Modular robotic systems employ a group of compatible autonomous components, which, through interactions between components, hardware redundancy, and reconfiguration capabilities, promise to offer increased versatility and robustness over other robotic systems. These promises and the rapid development of Unmanned Air System (UAS) technologies have triggered investigations regarding the feasibility of autonomous modular aerial vehicles.

Current applications for UAS include mapping, surveying, inspection, delivery, filming, photography, spraying, and seeding. Operators for these applications can have large fleets of different UAS with a variety of payloads that span a range of weights and dimensions.

Many current UAS require the UAS to perform translational motion and position stabilization by tilting its airframe, which makes them ill-suited for carrying/delivering payloads which need to remain at a constant orientation.

For rotorcraft systems, the most straightforward advantage of modularity is the ability to scale the number of rotors to the weight of the payload.

Modular systems could allow operators to use a unified system of compatible UAS which could be configured, manually or automatically, to adapt to specific payload and mission requirements. With self-contained modules and overactuated vehicles, redundancy of hardware ensures robustness and tolerance to failures, such as that of a rotor, flight computer, or inertial measurement unit. Besides, the use of a fleet of similar modules can also simplify maintenance and replacement schedules for UAS operators.

A potential benefit of reconfigurable modular UAS is their ability to be configured in fully actuated or omnidirectional aerial vehicles. Fully actuated aerial vehicles can independently change their thrust and torque around hovering conditions in all directions. Omnidirectional aerial vehicles are fully actuated aerial vehicles that are able to hover in any attitude.

Fully actuated aerial vehicles can perform translational motion and position stabilization without the need for tilting their airframe, but simply by changing the direction of their thrust vector. This makes them suitable for carrying payloads which need to remain at a constant orientation and for achieving a more reactive and efficient position control in adverse weather conditions than their underactuated counterparts. The ability of fully actuated aerial vehicles to remain at a fixed position while compensating for external torque and force disturbances also makes them good candidates for operating robotic. Omnidirectional aerial vehicles, since able to achieve arbitrary poses, can track six-DoF trajectories robustly. This presents an advantage for three-dimensional mapping, sensing, and object manipulation.

A crucial point of modular robotic designs is the type of docking mechanism for modules to connect. A robust and general docking mechanism allows a fleet of modules to be extended over time with other modules dedicated to specific tasks, such as sensing, actuation, or computing. For modular UAS, these added modules can be for instance battery packs, robotic arms, or electrooptical sensors. Modular rotorcraft UAS can therefore constitute the main component of a heterogeneous but compatible fleet of modules by providing the propulsion system, while being completed with specialized modules.

Many current efforts to develop modular rotorcraft UAS have focused on vehicles that form coplanar configurations, that is with vehicles assembling in a horizontal plane. Three-dimensional configurations of modular rotorcraft have seldom been explored, except for coaxial rotorcraft systems.

Despite the fact that three-dimensional configurations may incur more pronounced wake interactions between rotors, reducing their overall efficiency, they also benefit from some advantages. These are increased rigidity, more compact designs, and, if modules exhibit the appropriate symmetries, the ability to tilt them such as to create fully actuated or omnidirectional vehicles. With a careful positioning of the rotors in a three-dimensional configuration, it is possible to mitigate the effects of wake interactions.

The modular aircraft disclosed herein is a rotorcraft module designed to exploit all the aforementioned advantages. It can include a rigid unit with a regular dodecahedron frame, a fixed-pitch propeller, a slot for holding lithium-polymer batteries, and the electronics required for autonomous sensing, control of the propeller, and communication with a ground station. By adding an appropriate connection mechanism at the vertices of the dodecahedron frame, modules can be rigidly joined together. The symmetries of the regular dodecahedron allow a variety of geometrical configurations to be achieved. Coplanar assemblies are possible, but other configurations, with three-dimensional positioning and orienting of the modules, are also enabled. This opens to way to the creation of entirely new rotor configurations, while also allowing to replicate existing and proven configurations.

Described below is the modular aircraft disclosed herein in terms of module design and achievable configurations. An emphasis is placed on the versatility offered by the regular dodecahedron shape. A solution to the problem of allocating control inputs for overactuated systems of many modules is disclosed herein. Different objectives for optimal control allocation are introduced and compared, such as power consumption or control authority. Building upon the different metrics introduced for implementing control allocation strategies, a Mixed-Integer Programming (MIP) formulation is provided to describe feasible modular configurations some of their properties. This formulation is shown to be well approximated with second-order cone constraints, thereby allowing the use of solvers specialized to tackle these problems in order to study optimal configurations.

The building block of the presented modular UAS consists of a self-contained unit with a frame in the shape of a regular dodecahedron. Each module uses a fixed-pitch propeller for propulsion which can either be rotating clockwise (CW) or counter-clockwise (CCW). The propeller axis intersects two opposed vertices of the dodecahedron frame, and the propeller plane coincides with its center.

The polytope D is characterized by $V^D$, $E^D$, and $F^D$, which are respectively: the vertices of D, a subset of $R^3$, the edges of D, unordered pairs of $V^D$, and the faces of D, unordered quintuples of $V^D$.

D corresponds to a regular dodecahedron centered in $0_3$, of inradius 1, and with two opposed vertices on the vertical axis. For the mathematical description of modular configurations, the Modular aircraft disclosed herein can be assimilated without loss of generality to D, regardless of its actual size. The order of $S^D$ is 60.

$H^D \subset R^3$ is the closed convex hull of $V^D$.

The rotation group of D is $S^D := \{R \in SO(3) | RV^D = V^D\}$.

To form a rotorcraft vehicle capable of performing stable flight, modules can be combined together in different configurations. The set of possible configurations is determined by the two different methods of joining two modules together. Both methods consist in connecting a face of the first module frame with a face of the second module frame such that both faces are in the same plane. The difference between the two methods resides in the alignment of the two regular pentagon faces. Formally, both these connection methods can be defined as the composition between a rotation and a translation.

For $R \in SO(3)$ and $v \in R^3$, the isometry $c_{v,R}$ of $R^3$ is given by $\forall x \in R^3$, $C_{v,R}(x) := v + Rx$.

With the first connection, both faces have a pair of non-adjacent vertices coinciding and are symmetrically opposed around the axis formed by these vertices. The second dodecahedron can be obtained from the first one by a single rotation of c radians around that axis or alternatively with a single translation. Because it can be achieved by connecting two opposing faces of two modules in the same orientation, this connection is given the name opposed face matching. Any rotation preserving D can be combined with this method to obtain different orientations of the resulting module. The set of all opposed face matching connections is denoted $C^{ofm}$.

For $R \in S^D$, $v_i \in V^D$, and $v_j \in V^D$ with $\{v_i, v_j\} \in /E^D$ and $\{v_i, v_j\} \subset f$ for some f in $F^D$, the opposed face matching connection $c_{R,\{i,j\}}^{ofm}$ is given by $c_{R,\{i,j\}}^{ofm} := c_{v_i + v_j}, R$ The second method consists in having the two faces coinciding exactly. A translation followed by a rotation can be used to deduce the position of the second dodecahedron from the first one. The vertices of both matching faces coincide exactly. It can also be preceded by any rotation preserving D.

The set of all exact face matching connections is denoted $C^{efm}$. It is assumed that such formed connections are rigid.

For $f = \{v_{i0}, v_{i1}, v_{i2}, v_{i3}, v_{i4}\} \in F^D$, the exact face matching connection $c^{efm}_{R,f}$ is given by $c_{R,f}^{efm} := c_v, RR_{v,\pi}$ where $$v = \frac{2}{5}(v_{i_0} + v_{i_1} + v_{i_2} + v_{i_3} + v_{i_4})$$

and $R_{v,\pi}$ is the rotation of angle $\pi$ around v.

Though perhaps less intuitive, the opposed face matching connection method is the most useful as it allows to form triangles and tetrahedra with respectively three and four modules where each pair of modules is connected. Such connections can be used to form a variety of structurally efficient configurations. In fact, several common rotor configurations can be recreated by using this connection method. Besides, since all connections via opposed face matching can be described with translations only, modules resulting from successions of these connections all have the same frame orientation (not accounting for rotor orientation). For these reasons, from now on, all connections are assumed to be based on the opposed face matching method without explicitly referring it.

A configuration C of size $n \in N$ is a triple containing n positions, n orientations, and n rotor spinning directions: $C = \{(p_i, R_i, \epsilon_i), i \in 0; n-1\}$. $p_i \in R^3$ is the position of module i in the vehicle coordinate frame. $R_i \in SO(3)$ is the orientation matrix of module i, where the natural orientation for $R_i = I_3$ is the one shown in FIG. 1. $\epsilon_i \in \{-1, 1\}$ indicates the spinning direction of the rotor of module i, with $\epsilon_i = 1$ for clockwise a rotor and $\epsilon_i = -1$ for counterclockwise a rotor. Without loss of generality, it can be assumed that $p_0 = 0_3$ and $R_0 \in S^D$.

For two modules i and j with positions $p_i \in R^3$ and $p_j \in R^3$ and orientations $R_i \in SO(3)$ and $R_j \in SO(3)$, $(p_i, R_i)$ and $(p_j, R_j)$ are said to be compatible if cpi, $$Ri \, \text{int}^{H^D} \cap c_{p_j, R_j} \text{int}^{(H^D)} = \emptyset.$$

By extension, modules i and j are said to be compatible.

For $p_i$ and $p_j$ as above with $R_i \in S^D$ and $R_j \in S^D$, $(p_i, R_i)$ and $(p_j, R_j)$ are compatible if and only if $$\frac{p_i - p_j}{2} \notin \text{int}^{(H^D)}.$$

By definition of $S^D$, cpi, $R_i \text{int}^{(H^D)} = p_i + R_i \text{int}^{(H^D)} = p_i + \text{int}^{(H^D)}$.

The same is true when substituting i for j, such that cpi, $$Ri \, \text{int}^{HD} \cap c_{p_j, R_j} \text{int}(H^D) = \emptyset \Leftrightarrow p_i - p_j + \text{int}^{(H^D)} \cap i\text{int}^{(H^D)} =$$

$$\emptyset \Leftrightarrow \{p_i - p_j\} \cap 2\text{int}^{(H^D)} = \emptyset \Leftrightarrow \frac{p_i - p_j}{2} \notin \text{int}^{(H^D)},$$

where the fact that $H^D$ is a convex set was used.

Given a finite sequence of n connections $(c_{p_o, R_o}, \ldots c_{p_{n-1}}, 1, R, 1)$, the succession of these connections is given by $C_{p0,R0} \otimes \ldots \otimes Cp_{n-1}, R_{n-1} := c_{p0} + \ldots + p_{n-1}, R_{n-1} \ldots R_0$.

Note that this definition is different from the composition of isometries. This is due to the fact that the translations are always done in the coordinate frame of the vehicle.

Given a set of connections $C \subset C^{ofm}$, for a module with position p and orientation R, (p, R) is said feasible with respect to C if there exists a finite sequence of connections $c_i \in C$, $0 \leq i \leq n$, such that $c_0 \otimes \ldots \otimes c_n = c_{p,R}$.

By extension, this module is said feasible with respect to C.

Given C above, a configuration $C = \{(p_i, R_i, \epsilon_i), i \in 0; n-1\}$ is feasible with respect to C if for every $i \in 0; n-1$, $(p_i, R_i)$ is feasible with respect to C and for every $i \in 0; n-1$ and $j \in 0; n-1$ with $i \neq j$, $(p_i, R_i)$ and $(p_j, R_j)$ are compatible.

Assuming that all opposed face matching connections are allowed, the feasibility of every module can be determined by studying its position and orientation independently. Its position must be a finite sum of translation vectors as herein and its orientation must belong to SD.

In the rest of this subsection, feasible configurations and their geometries are explored in more details.

Since it has been shown that compatibility between modules and feasibility of position with respect to $C^{ofm}$ depends only on the set of translation vectors used for connections, all connections are grouped by equal translations. $C_v$ is the subset of $C^{ofm}$ defined by $C_v:=\{C_{u,R}\in C^{ofm}|u=v\}$. $C^-$ is defined by $C^-:=\{C_{u+v}|\{u,v\}\notin E^D, \{u,v\}\subset F^D\}$.

The set C is a partition of $C^{ofm}$ and it has 60 elements.

The fact that C is a partition of $C^{ofm}$ is immediately deduced from the above. According to these same definitions, the number of elements of $C^{ofm}$ is equal to the number of faces of the regular dodecahedron, that is 12, multiplied by the number of pairs of non-adjacent vertices of a given face, that is 5, which gives 60.

$C^-$ is isomorphic to the set of translations used to make connections. Therefore, in a slight abuse of notation, elements of $C^-$ are sometimes directly assimilated to the vector their represent in the following. This set of vectors determines the feasible positions for modules in a configuration, defined below by taking the combinations of possible translations with integer coefficients.

The set P is defined as the additive subgroup of $R^3$ generated by the translation vectors of all possible connections: $P:=^X vZ; Cv\in C^-$.

For any open subset of $R^3$, there is an infinite number of feasible positions for a module in that subset. Fact 2.5 shows that for a given pair of connected dodecahedra, there are only 45 possible positions that a third dodecahedron can take to connect with the first one while being compatible with the second one. Among these 45 configurations, 4 also form a connection with the second dodecahedron. As more dodecahedral modules are added, the constraints represented by the requirement of not intersecting with other dodecahedra increase and make the enumeration of possible configurations difficult. P is dense in $R^3$. For $C_u\in C^-$, there are 45 elements $C_v$ of $C^-$ such that u and v are compatible. $_v\in C^-$, u−2v∈/.

This can be proven by checking whether for every C int ($H^D$ ).

A restricted set of possible connections can be used, such that the set of feasible positions induced by these connections is a three-dimensional lattice, therefore parameterizable by 3 integer variables, with the guarantee that different positions from that lattice are compatible. This restricted set of connections allows only one possible connection per face for a total of 12 different induced relative positions between two dodecahedra. Only 8 vertices of the dodecahedron are used for these connections, with each of these vertices involved in 3 different possible connections. These vertices form a cube and can be chosen arbitrarily as long as they satisfy this requirement, though one of the vertices must be the top or bottom one to recreate classic configurations.

Note that in practice, since modules may be rotated according to all symmetries of the regular dodecahedron, all vertices of their frame need to be able to accommodate connections with other modules. However, once the orientation of a module is fixed, only a subset of these vertices can be used to form connections.

There exists a subset $V^{cube}$ of $V^D$ that defines a cube. The set of unordered pairs of $V^{cube}$ corresponding to the edges of this cube are denoted $E^{cube}$. Any subset of $V^D$ verifying the same condition can be obtained from $V^{cube}$ with a rotation in $S^D$. For $\{u,v\}\in E^{cube}$, $\{u,v\}\in /E^D$ and there is a face $f\in F^D$ such that $\{u,v\}\subset f$, implying that $C_{u+v}\in C$. $C^{cube}=\{C_{u+v}|\{u,v\}\in E^{cube}\}$. The vectors of $C^{cube}$ form a cuboctahedron. By choosing an appropriate basis of $R^3$, the coordinates of the vertices of $V^{cube}$ are given by $(\pm\frac{1}{2},\pm\frac{1}{2},\pm\frac{1}{2})$. In this same basis, the coordinates of the vectors in $\{u+v,(u,v)\in E^{cube}\}$ are $(\pm 1,\pm 1,0)$, $(\pm 1,0,\pm 1)$, and $(0,\pm 1,\pm 1)$, which correspond to the vertices of a cuboctahedron.

The set of positions feasible with respect to $C^{cube}$ is defined by $P^{cube}=X vZ; C_v\in C^{cube}$.

$P^{cube}$ is a three-dimensional lattice for which a basis can be chosen among $C^{cube}$. Every point of $p^{cube}$ can therefore be associated with a unique triple of three coordinates and every pair of distinct coordinates corresponds to compatible positions.

$P^{cube}$ is a three-dimensional lattice of $R^3$ and a basis of it can be found among the vectors of $C^{cube}$. $p^{cube}$ is generated by $(1,1,0)$, $(1,0,1)$, and $(0,1,1)$, which are three linearly independent vectors, thus forming the basis of a lattice.

For a given position of a module in a configuration, there are as many possible orientations of that module as there are elements of the symmetry group of the regular dodecahedron, which is of order 60. In practice, these 60 orientations can be partitioned in 20 groups of 3 equivalent orientations that correspond to identical orientations of the normal of the module's rotor. This partition is defined: for $v\in V^D$, $S_v$ is the subset of $S^D$ defined by $$S_v := \{R \in S_v \mid R[0\ 0\ 1]^T = \frac{v}{\|v\|}\}.$$

$S^-$ is defined by $S^-:=\{S_v|v\in V^D\}$.

Since elements from a same group $S_v$ are equivalent in term of module's orientation, from now on, the orientation $R_i\in S_v$ of a module i in a configuration is directly described by $$\eta_i = \frac{v}{\|v\|},$$

the unit-vector in the direction of the thrust produced by the module in the configuration frame. A configuration C of n modules is therefore written $C=\{(p_i,\eta_i,\epsilon_i), i\in 0;n-1\}$.

By further grouping the different feasible orientations by the angle formed between the rotor axis and the vertical axis, named tilt angle, six groups are obtained. The three group with angles inferior to $\pi/2$ radians, corresponding to a positive vertical thrust, are represented in FIG. 4A. The first of these three angles is equal to 0° and corresponds to a vertical orientation, and the two others are approximately equal to 41.81° and 70.53°.

Configurations with modules at different tilt angles have a lower thrust to weight ratio than configurations with parallel, upward pointed modules. Nonetheless, such configurations have a couple of advantages over standard configurations that are detailed herein.

Tilted modules generate a thrust with a horizontal component, therefore allowing the total thrust of the modular vehicle to reside in a two- or three-dimensional space. This can be used to reject force disturbances on the airframe directly with a thrust in the opposite direction, rather than changing the attitude of the vehicle to align its vertical axis against the disturbance. This ability can lead to a better stability in position and also allows the vehicle to keep its orientation constant while maintaining its position, a desirable property when carrying a payload that requires to remain in a fixed orientation, such as a camera. Payloads that operate by physical contact with the environment, such as robotic manipulators and contact probes, also benefit from configurations with at least six modules whose orientations allow the generation of decoupled three-dimensional thrusts and torques. Such configurations indeed allow to maintain a fixed position and orientation while compensating for arbitrary force and moment disturbances induced by the payload interacting with its environment.

For vehicle configurations having modules whose rotor axis does not intersect the vertical axis of the vehicle body frame, these modules can be used to generate yawing moments with their positive lever arm around that axis, instead of relying on the rotors' counteracting torques. The advantage of using lever arms for moment generation comes from the fact that lever arms increase linearly with the distance of the module to the axis of the moment of interest, whereas the magnitude of available counteracting torques remains constant irrespectively of a module's position. This can be an issue for effectively controlling the yaw of a vehicle. Indeed, when a module is the subject of a force perturbation incurring a yawing moment on the vehicle, this yawing moment also scales linearly with the lever arm of the module. This disproportionate increase between moments from force disturbances and available counteracting torques as vehicles employ more modules therefore leads to a vanishing yaw authority of coplanar configurations.

The dynamics of a configuration C can be described by considering rigid body kinematics and forces and moments induced by each module's rotor.

The body-fixed frame B, which is the frame of the configuration already used to describe feasible positions and orientations, is attached to the assembled vehicle to describe its motion with respect to an inertial frame I. The notation $p_i \in R^3$ is reused to describe the position of module $i \in 0;n-1$. However $p_0=[0\ 0\ 0]^T$, instead of having, the origin of B is chosen such that $\Sigma_{i=0}^{n-1}=0$. Since all modules are assumed to have the same mass and have their center of gravity coinciding with the center of the dodecahedron frame, the origin of B is also the center of mass of the vehicle.

The position and orientation of the vehicle in I are given by the vector $x \in R^3$ and the attitude matrix $R \in SO(3)$. The angular velocity of the vehicle in B is given by the vector $\Omega \in R^3$. Each module is assumed to generate a thrust and torque both proportional to the square of the rotation speed of its rotor. The total thrust and torque induced on the vehicle in B are respectively written $MC,Tu$ and $MC,\tau u$. $MC,T \in R^{3 \times n}$ and $MC,\tau \in R^{3 \times n}$ are the thrust and torque matrices. They depend on the rotors' thrust and drag coefficients, their directions of rotation, and the modules' positions and orientations. $u \in U$ is the control vector, which corresponds to the rotors' squared rotation speeds. The admissible control set is defined by: $U:=\{u \in R^n | u_{min} \leq u_i \leq u_{max}, \forall i \in 0;n-1\}$, where $u_{min}$ and $u_{max}$ are positive real values. Alternatively, the matrix $A \in R^{2n \times n}$ and vector $b \in R^2 n$ are defined to represent U with $U=\{u \in R^n | Au \leq b\}$ The thrust generated by the rotors leads to the following translational dynamics: $m_c x''=RM_{C,T}u+m_c G$. $m_C$ is the mass of the vehicle and G is the gravity vector. As to rotational dynamics, they are given by $J_C \dot\Omega=-\Omega \times J_C \Omega+\tau_g+M_{C,\tau} u$, where $J_C$ is the inertia tensor of the vehicle in B and $\tau_g$ is a term containing the gyroscopic moments incurred by the rotation of the rotors. The kinematic equation relating the derivative of the attitude matrix to the angular velocities is $\dot R=R[\Omega]\times$ where $[.]\times: R^3 \to so(3)$ denotes the cross-product from the left.

The mass mc and inertia tensor $J_C$ of C can be determined from the mass mM and inertia tensor $J_M$ of a module by adding the modules' masses and by using the parallel axis theorem:

$$m_c=nm_M, J_c=\Sigma_{i=0}^{n-1} J_M=m_M(p_i^T p_i I_3 - p_i p_i^T)$$

The thrust and torques matrices of C are given by:

$$M_{C,T}=k_T[\eta_0 \ldots \eta_{n-1}],$$

$$M_{C,\tau}=k_\tau[\epsilon_0 \eta_0 \ldots \epsilon_{n-1}\eta_{n-1}]+k_T[p_0 \times \eta_0 \ldots p_{n-1} \times \eta_{n-1}]$$

Multiple aerodynamics effects have not been included in the dynamics of the vehicle. Typically, they are considered as disturbances which are handled by the control system, for instance with the use of the integral terms of PID control loops or by directly measuring force disturbances and using them in control algorithms.

Although no formal guarantee is usually provided regarding the stability of the control system of UAS with respect to unmodeled dynamics, it is important to know how unmodeled effects scale as the number of modules in a configuration increases to form an intuition on the behavior of large modular vehicles. If indeed, disturbance terms have a larger marginal increase as modular vehicles grow than modeled terms to which they add, then typical control systems may not be able to handle them properly. Some of these effects and how they scale with large configurations are discussed in the following.

In the definition of the control vector given in this section, it is assumed that the rotation speed of each module's rotor is reached instantly, that the thrust and torque produced by the rotor are linear in its squared rotation speed, and that there is no drag induced in forward flight. These assumptions are not exactly true, although they are used for designing control systems of most multirotors with satisfactory performance.

In practice, for each change of desired rotor speed, there is a transitional regime during which the rotor speed increases or decreases to the given setpoint. During that regime, for each rotor, a reaction torque of value $-J_r \omega$ is incurred around the axis of that rotor, where $J_r$ is the inertia of the rotor and w its rotation speed. This reaction torque is therefore expected to remain a small disturbance as more modules are added airspeed with respect to a rotor as the vehicle moves means that produced thrust and torque are not static for a constant rotor speed and that drag is also created. A formulation of rotor thrust, torque, and lateral drag has been given previously using blade element theory and blade momentum element theory. These three values' dominant terms scale quadratically with the airstream velocity, as it can be expected from standard formulations of lift and drag. It is directly seen that a problem might arise for modules far away from a configuration's center of mass when it rotates, as these will experience higher velocities than modules close to the center of mass, leading to an inaccurate modeling of the thrust and torque they create. This must be taken in account when controlling large configurations. For instance, when using a cascaded control architecture where angular velocity setpoints are used to reach a prescribed attitude, the magnitude of these setpoints should be roughly proportional to the squared inverse of the size of the configuration. The slower achieved attitude changes for large configurations are another reason to favor tilted rotors configurations, since a position control relying on changes of attitude rather than three-dimensional thrust may be unreliable.

Another aerodynamic effect that is not included in the model of the dynamics used in this work is the drag on the airframe of the modular vehicle. For multirotors, airframe drag is usually modeled to be linear, or quadratic in the velocity of the vehicle. Therefore, as long as typical angular velocities are scaled down as configurations grow in size for reasons explained in the previous paragraph, typical drag terms per module will also remain limited.

Control strategies for multirotor vehicles are usually designed such that the resulting control vector consists of a collective thrust and three torque values. The actual motor inputs are then deduced from this vector via a matrix multiplication. This remain true of different types of control architectures and objectives, for instance PID controllers for position and attitude stabilization or differential flatness-based methods for trajectory tracking. In some works, instead of outputting torques, the controller outputs angular velocities, as it assumed that a low-level high-bandwidth controller is able to track angular velocity setpoints accurately. For fully actuated multirotor vehicles, the collective thrust is replaced by a three-dimensional thrust resulting in a six-dimensional control vector.

When controlling a quad-rotorcraft, the transformation from desired collective thrust and torque to motor inputs relies on a four-by-four matrix inversion and is therefore one-to-one. So is the transformation between thrust and torque input to motor inputs for a fully-actuated hexa-rotorcraft. However, for overactuated vehicles, which large modular configurations are, there are multiple motor inputs leading to same thrust and torque values. The problem of control allocation consists in finding optimal motor inputs that yield the desired thrust and torque setpoints. This problem is crucial for configurations involving many modules and is therefore the subject of the first part of this section. Higherorder control methods that output the desired thrust and torque setpoints are not studied for modular configurations since specific methods for the type of vehicle assembled can be used.

For a configuration C of n modules, a dynamics matrix M that bundles the thrust and torque matrices together is defined:

$$M := \begin{bmatrix} M_{C,T} \\ M_{C,\tau} \end{bmatrix} \in \mathbb{R}^{6 \times n}$$

For readability, the subscript C is not repeated for the dynamics matrix as there is no ambiguity.

The rank of M is written p≤6. The set of achievable thrust and torque values S is defined as the image of the admissible control set by M: S:=MU.

Assuming that U is a polytope, S is a polytope too and is included in a linear subspace of $\mathbb{R}^6$ of dimension p.

In general, the problem of control allocation is a constrained minimization problem that can be formulated by: minimize f(u) subject to u∈U, Mu=s, wherefis a cost function and s∈S is a control setpoint.

A desirable objective for the control allocation problem is to minimize the total power consumption of the modular configuration.

The power induced by a single rotor is a function of multiple variables such as the angular speed of the rotor, the relative velocity of the inflow of air, and the electrical parameters of the motor. This makes the determination of the power consumption a complex problem in general. A simplified model based on momentum theory can be used to derive an ideal power consumption P for a rotor generating a thrust T. This model assumes that a rotor is a perfect actuator disk of surface area a inducing a constant velocity of the airflow along its surface. For a stationary rotor, the induced power according to this model is given by:

$$P = \sqrt{\frac{T^3}{2\rho a}}$$

where p is the density of air.

Since the control inputs are proportional to the thrusts output by each module, the problem of minimizing total power consumption for a given control setpoint can be rewritten: minimize $$\sum_{i=0}^{n-1} u_i^{\frac{3}{2}}$$

subject to u∈U and Mu=s.

Although this optimization problem does not have a closed-form solution, the objective function is convex while the constraints are linear, making it solvable in practice with efficient numerical methods such as interior-point methods.

Minimizing total power consumption is the most energy-efficient strategy at the scale of the whole configuration, but it will tend to incur larger control inputs for modules further from the center of gravity of the configuration because of the greater torque they can achieve through their larger lever arm. As modules are designed to be self-contained and to rely on their own energy supply, those modules with larger control inputs will deplete their energy source faster. For this reason, it might be beneficial to ensure that overall, modules contribute the same amount of energy to the control of the configuration. Two different objectives are suggested to express that goal. With the first objective the goal is to find the control inputs that minimize the maximum power consumption required from a module, as formulated by: minimize max $$0 \le i \le n-1 u_i^{\frac{3}{2}}$$

subject to u∈U and Mu=s, which is equivalent to: minimize max 0≤i≤n−1, subject to u∈U and Mu=s, and finally to minimize λ subject to u∈U, Mu=s, $u_0 \le \lambda$, and $u_{n-1} \le \lambda$.

This minimization problem is therefore a linear program, which makes it solvable efficiently in practice.

A second objective that is suggested to achieve an overall similar power consumption between modules is to minimize the mean squared deviation of the estimated power consumption. This can by formulated by the problem: Minimize $$\sum_{i=0}^{n-1} \left( u_i^{\frac{3}{2}} - \frac{1}{n} \sum_{i=0}^{n-1} u_i^{\frac{3}{2}} \right)$$

subject to u∈U and Mu=s, which is not a convex program.

This problem can be changed to minimize the mean squared deviation of the control inputs, which in turn is a convex, second-order cone-representable, program: minimize $\Sigma_{i=0}^{n-1}(u_i - 1/n \, \Sigma_{i=0}^{n-1} u_i)$ subject to u∈U and Mu=s.

Even though the optimization problems introduced for control allocation can be numbers solved in practice, the computation time required to find a solution might still be too high for the requirements of high-frequency flight controllers, for which update rates of 400 Hz are common. This fact is particularly true of vehicles with many propellers. For this reason, it might be desirable to use a fixed allocation matrix $C \in \mathbb{R}^{n \times 6}$ such that MCs=s, ∀s∈S.

Such a matrix always exists since, by definition, S⊂Im (M). The constraint Ct=0, ∀t ∈ $S^{\perp}$ can also be added on the matrix C to reduce the number of variables involved in searching for such a matrix. This method has the advantage of only requiring a matrix multiplication for the computation of the motor inputs u=Cs given the control setpoint s. Note however that there is no guarantee that the control input vector obtained by this method is feasible when the target s is reachable. A new set of reachable thrust and torque setpoints $S^C$ using the allocation matrix C is therefore defined by $S^C=\{s\in S|Cs\in U\}$.

For configurations with redundant degrees of actuation, that is when n>p, multiple choices of the matrix C exist. In the following, several optimization problems are suggested to find specific allocation matrices corresponding to different objectives that may be desired.

As just mentioned, using a fixed allocation matrix C reduces the set of achievable thrust and torque vectors and therefore the control authority of the configuration. Nonetheless, it is possible to choose C such that the resulting control authority is maximized. A way to do this is to maximize the radius of a sphere enclosed in the space of achievable thrust and torque pairs under the constraints that the resulting control inputs are feasible and that the resulting allocation matrix is a pseudo-inverse of M as defined above. Formally, it results in the following problem: maximize r subject to $MC(T_0+s)=T_0+s$, $\forall s \in S$ $Ct=0$, $\forall t \in S \perp s \in S$, $\|s\|_2 \leq r = \Rightarrow AC(T_0+s) \leq b$.

$T_0$ is the value at which the zero-dynamics are achieved, that is the thrust and torque vector required for hovering (typically $[0\ mg\ 0\ 0\ 0]^T$).

$MC(T_0+s)=T_0+s$ and $AC(T_0+s)\leq b$ for $s\in Im(M)$ automatically imply that $T_0+s \in S$ by definition of S as given in eq. (12). Therefore the constraint $T_0+s\in S$, $\|s\|_2\leq r=\Rightarrow AC(T_0+s)\leq b$ can be replaced by $s\in Im(M)$, $\|s\|_2\leq r=\Rightarrow AC(T_0+s)\leq b$.

By introducing the matrix $H\in R^{6\times 6}$ which is the orthogonal projection on Im(M) and by noticing that $\sup\{A_iCs|s\in Im(M),\|s\|_2\leq r\}=\sup$ $\{A_iCHx|x\in \mathbb{R}^6, \|Hx\|_2\leq r=r\|HC^TA_i^T\|_2$ where $A_i$ is the i-th row of A, this can be rewritten: maximize r subject to MCs=s, $\forall s \in S$ Ct=0, $\forall t \in S^\perp$ $r\|HC^TA^T\|_2$ $b_i-A_iCT_0$, $\forall i\in 0;n-1$. This problem is similar to the one of finding the center of the sphere of maximum radius enclosed in a polytope, known as the Chebyshev center. Unlike in the classic problem, the polytope involved here is not fixed and the last inequality is non-convex. For this reason, the constraint $CT_0=u^{eq}$ with $u^{eq} \in R^n$ is added, which is not excessively restrictive. It may indeed be desired that $u^{eq}$ is preset such that all modules have the same commanded input at hover. With this relaxation and by defining $$z=\frac{1}{r},$$

the problem immediately above can be transformed in a convex optimization problem: minimize z subject to MC=H, CH=C, $CT0=u_{eq}$, and $\|HC^TA^Ti\|_2 \leq biz - Aiu^{eq}z$, $i\in 0; n-1$, the fact that: $MCs=s$ $\forall s \in S \Leftrightarrow MCH=H \Leftrightarrow MC=H$ and Ct=0, $\forall t\in S^\perp \Leftrightarrow CH=C \Leftrightarrow CH=C$ is used to reformulate the equality constraints in problem (26). Problem (26) is a second-order cone program, making the use of interior points methods specific to this type of program possible.

The allocation problem for minimizing the power consumption of a configuration can be adapted to the case of a fixed allocation matrix. To do so, a random vector $X\sim N(T_0, \Sigma)$ is introduced, where $T_0$ is the hovering thrust and torque vector and $\Sigma \in S_6^+$ a covariance matrix. X corresponds to a thrust and torque vector to be transformed in a set of control inputs and is assumed to belong to Im(M), which is guaranteed by $T_0 \in Im(M)$ and $Im(\Sigma)\subset Im(M)$. With this characterization of X, the requirement that $X\in S$ is omitted and it is assumed that $\Sigma$ is chosen such that most of the values taken X are actually in S.

Under these assumptions, the control input for module i is a random variable given by $u_i\sim N(C_iT_0, C_i\Sigma C_i^T)$.

Since the power consumption of that module is proportional to $|u_i|^{3/2}$, where the absolute value is to ensure validity of the expression, the average power consumption $P_i$ of module i is given by the absolute moment of order:

$$\frac{3}{2} \text{ of } u_i: P_i \propto E\left(|u_i|^{\frac{3}{2}}\right)$$

This absolute moment is given by the confluent hypergeometric function of the first kind, namely $_1F_1(a,b,z)$, with $$a=-\frac{3}{4}, b=\frac{1}{2}, \text{ and } z=-\frac{(C_iT_0)^2}{2C_i\sum C_i^T}.$$

By once again assuming that $CT_0=u^{eq}$, the total average power P consumption of the configuration is then given by $$P \propto \sum_{i=0}^{n-1} F_1\left(-\frac{3}{4}, \frac{1}{2}, -\frac{u_i^{eq}}{2C_i\sum C_i^T}\right).$$

The problem: minimize $$\sum_{i=0}^{n-1} F_1\left(-\frac{3}{4}, \frac{1}{2}, -\frac{(C_iT_0)^2}{2C_i\sum C_i^T}\right)$$

subject to MC=H and C=CH therefore belongs to the class of convex programs.

Similarly to what was done previously to find a control input vector that yields specific thrust and torques while minimizing the maximum module power consumption, it if possible to formulate a convex program to find an allocation matrix that minimizes the maximum average power consumption: minimize $\lambda$ subject to MC=H, CH=C, $CT_0=u^{eq}$, and $$_1F_1\left(-\frac{3}{4}, \frac{1}{2}, -\frac{C_iT_0^2}{2C_i\sum C_i^t}\right) \leq \lambda,$$

$\forall i\in 0; n-1$

By reusing the same notations, one can formulate a problem whose objective is to minimize the average mean squared deviation of the control vector. For $i\in 0;n-1$, the mean deviation of the control $u_i$ is a normally distributed random variable: $u_i-x\ u_j\sim N(V_iu^{eq},V_iC\Sigma C^TV_i^T)$.

$V_i$ is defined as the row vector of size n with entries equal to $$-\frac{1}{n}$$

everywhere except for the i-th entry which is equal to $$\frac{n-1}{n}.$$

The average squared deviation of $u_i$ is therefore equal to:

$$E(|u_i - \Sigma_{j=0}^{n-1} u_j|^2) = (V_i u^{eq})^2 + V_i C \Sigma C^T V_i^T.$$

The minimization of the average mean squared deviation of the control vector can then be formulated as the following second-order cone representable program: minimize $\Sigma_{j=0}^{n-1} V_i C \Sigma C^T V_i^T$ subject to MC=H, CH=C, and CT0=ueq.

Since all the constraints in this program are equality constraints, it is possible to reduce it to a single linear equation. To see that, the above is reformulated by vectorizing the variable C: minimize $\text{vec}(C^T)^T (W \otimes \Sigma) \text{vec}(C^T)$ subject to: $(I_n \otimes H - I_{6n}) \text{vec}(C^T) = 0$; $(M \otimes I_6) \text{vec}(C^T) = \text{vec}(H)$; $(I_n \otimes T_0^T) \text{vec}(C^T) = u^{eq}$, where $W := \Sigma_{j=0}^{n-1} V_i^T$ $$V_i = I_n - \frac{1}{n} 1_{n \times n}.$$

Since the constraints in this quadratic minimization problem are all equality constraints, the solution is known to satisfy the linear equation:

$$\begin{bmatrix} 2W \otimes \Sigma & I_n \otimes H - I_{6n} & M^T \otimes I_6 & I_n \otimes T_0 \\ I_n \otimes H - I_{6n} & 0 & 0 & 0 \\ M \otimes I_6 & 0 & 0 & 0 \\ I_n \otimes T_0^T & 0 & 0 & 0 \end{bmatrix} \begin{bmatrix} \text{vec}(C^T) \\ y \end{bmatrix} = \begin{bmatrix} 0 \\ 0 \\ \text{vec}(H) \\ u^{eq} \end{bmatrix},$$

where y is a Lagrange multiplier.

For a given configuration, it is possible to compare the control authority resulting from different allocation matrices by solving program (25) with C fixed. The control authority is then defined as the obtained value of r. Greater values therefore mean the availability of larger thrusts or torques with the assigned control allocation matrix. Values of the control authority with different control allocation matrices can be compared with the maximum control authority available, which is the value of r found by solving: maximize r subject to $s \in R^6$, $\|Hs\|_2 \leq \Leftrightarrow T_0 + s \in S$.

Solving this problem can be done by the same method used to find the Chebychev center of a polytope. However, it implies finding the expression of S, which is the projection of a polytope, as a set of linear inequalities. This problem is known to be intractable in general, making the determination of the maximum control authority available impossible for large configurations.

Comparing different configurations is also possible, although in this case, program 25 needs to be adapted to include the mass and inertia of the vehicle to ensure a meaningful comparison. The adapted problem including the mass and inertia of the studied vehicle is formulated by maximizing r subject to $r \| H J^e C^T A_i^T \|_2 \leq b_i - A_i C T_0$, $\forall i \in 0; n-1$, where $J^e$ is an extended inertia matrix that includes the mass and inertia tensor of the studied configuration:

$$J^e = \begin{bmatrix} m I_3 & 0 \\ 0 & J \end{bmatrix}.$$

With this formulation, r represents the control authority in term of linear and angular accelerations rather than thrusts and torques.

The matrix H, which was previously defined as the orthogonal projection on Im(C), can also be chosen to project on a strict subspace of Im(C) to study the control authority around specific axes.

The determination of the control authority under a provided allocation matrix can also be performed for the case of a rotor failure for overactuated configurations. To account for a failure of rotor $i \in 0; n-1$, the corresponding row in C can be zeroed out or the allocation matrix can be replaced altogether by a new matrix $C^{fault,i}$ which is meant to be used when the failure is detected. $C^{fault,i}$ can be chosen by any of the methods previously introduced. The control allocation matrix used in normal conditions can also be chosen to maximize control authority in case of undetected failure. The program used to find this matrix is an adaptation of problem that accounts for all cases of one rotor failure: minimize z subject to MC=H, CH=C, CT0=ueq, and $\|H C^T A_i^T\|_2 \leq b_i z - A_i u^{eq} z$, $\forall i \in 0; n-1$. Given the versatility offered by the modular architecture presented in this work, it can also be desirable to have a way to find assembly configurations that are optimal for a given objective. Using mixed-integer programming (MIP), it is possible to describe configurations and their properties with decision variables such that the programs already introduced can be extended to account for a parameterized space of possible configurations on which an optimum exists. The fact that the modules must form a connected entity is expressed as a set of linear constraints based on a MIP formulation of contiguity for graphs. Products of decision variables that occur when the dynamics matrix M or the inertia matrix I is multiplied with the allocation matrix C are linearized with the big-M method.

The search space of module positions used to determine an optimal assembly according to a specific measure can be described as a infinite undirected graph $G_\infty = (V_\infty, E_\infty)$. The set of vertices $V_\infty$ corresponds to the admissible positions in P, with $v_p \in V_\infty$ denoting the vertex associated with the position $p \in P$. For p and q vectors of P, $(v_p, v_q)$ is in $E_\infty$ if $q - p \in C$. Because C is stable by negation, $(v_p, v_q) \in E_\infty$ if and only if $(v_q, v_p) \in E_\infty$.

An assembly containing n modules can therefore be described as a subgraph of G with n vertices.

An increasing set $\{G_i = (V_i, E_i): i \in N\}$ of finite subgraphs of G is defined by: $V0 = \{v(0,0,0)\}$, $V_i = V_{i-1} \cup \{v \in V | \exists u \in V_{i-1}, (u,v) \in E_\infty\}$, $\forall i > 0$ $E_i$, and $= \{(u,v) \in E_\infty | u \in V_i, v \in V_i\}$, $\forall i \geq 0$.

To find an optimal configuration for a given number of modules n, it is sufficient to consider the graph $G_{\lfloor n/2 \rfloor}$. Indeed, knowing that all the modules in a valid configuration must be connected, there exists one module from which every other module of the assembly can be reached with at most $\lfloor n/2 \rfloor$ connections, and this module can be chosen to be placed at position (0,0,0).

A configuration described by a finite subgraph of $G_\infty$ is valid only if that subgraph is connected. A MIP formulation can be used to define this constraint and be used in optimization problems whose solutions will always correspond to valid configurations. Assuming that the number of modules $n \in N$ for a desired configuration is known and assuming that G=(V,E) is a finite subgraph of $G_\infty$ of size $N \in N$ used as the search space of possible configuration, the MIP contiguity constraint can be formulated with

X $y_{uv} - y_{vu} \leq x_u - n w_u$, $\forall u \in V$ $\{v | (u,v) \in E\}$

X
$y_{uv} \leq (n-1)x_u$, $\forall u \in V$
$\{v|(u,v) \in E\}$
X
$w_u = 1$
$u \in V$
$x_u \in \{0,1\}$
$w_u \in \{0,1\}$
$y_{uv} \geq 0$, $\forall (u, v) \in E$.

The binary variable $x_u$ indicates whether a module position is allocated to the configuration. w, is a binary variable indicating whether u is the sink and $y_{uv}$ represents the flow going from u to v.

Some of the linear constraints introduced by the programs defined above, if reused in a program where the configuration is determined by decision variables, become bilinear. For instance, the constraint MC=H is bilinear when both M and C are problem variables. Such constraints can be linearized with the big-M method when at least one of the variables involved in each products of variables is binary. For a product of variable wx with w being binary, a new variable y can be introduced with the equality wx=y ensured by the set of following inequalities: $y \leq zm$ $y \geq -zm$, $y \leq x-m(z-1)$, and $y \geq x+m(z-1)$, where m is a constant chosen such that x m is implied by the other constraints of the problem, hence the name big-M method, although m should be chosen as small as possible for numerical stability.

The frame of the prototype is made of carbon fiber reinforced polymer (CRFP) tubes connected together with multiple 3D printed plastic parts. The first part is a short tube with a closed end made of soft thermal polyurethane (TPU). These tubes enclose each end of the CRFP tubes and remain in place with a tight fit. A pair of fitting parts made of PETG are used for each corner of the dodecahedron frame. Each pair is joined together with metal fasteners and clamps three TPU end tubes. The PETG parts also include holes to place fasteners that join different modules together.

For propulsion, each module prototype uses a brushless motor with a rating of 465 kV controlled by an electronic speed controller and a threeblade propeller with a diameter of about 39.3 cm that can be oriented either CW or CCW. The motor, electronic speed controller, and propeller are from the drone parts manufacturer KDE.

Each module can hold a Pixhawk 4 flight controller which sends a PWM signal to the electronic speed controller and may as well be used to control other modules of the assembly via standard servo cable connections. Typically only one flight controller per assembly is needed.

The prototype includes a FrSky X8R receiver to receive radio commands from the operator and a WiFi module to communicate with the ground station.

Two slots are reserved per module for lithium-polymer batteries with a capacity of 1350 mAh and a number of six cells each.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A method comprising:
    rigidly coupling at least a first adjacent aircraft module to a second adjacent aircraft module to form a modular aircraft;
    wherein:
        each aircraft module comprises:
            a regular dodecahedral cage structure having regular pentagon faces, each of the regular pentagon faces lying in a different plane one from another, each of the regular pentagon faces having five sequential edges and five vertices forming a complete loop defining the regular pentagon face, each pair of adjacent sequential edges connected at a common single vertex from among the five vertices and forming an interior angle of 108°;
            a single, fixed-pitched propeller with an axis of rotation; and
            a motor configured to drive the propeller;
        rigidly coupling comprises attaching one of the regular pentagon faces of the first adjacent aircraft module to one of the regular pentagon faces of the second adjacent aircraft module;
        the attached regular pentagon faces of the adjacent aircraft modules lie in the same plane; and
        the attached regular pentagon faces of the adjacent aircraft modules are in one of two relative alignments, a first alignment in which all five vertices of each regular pentagon face coincide exactly, or a second alignment in which only two of the five vertices of each regular pentagon face coincide exactly.

2. The method of claim 1 further comprising:
    attaching a first payload to the modular aircraft at a first point;
    controlling the motor of at least one of the aircraft modules to compensate for a moment induced by the first payload to maintain an orientation of the modular aircraft; and
    arranging the aircraft modules such that control of the modular aircraft is maintained upon a failure of at least one motor of the aircraft modules.

3. The method of claim 2 further comprising:
    attaching a second payload to the modular aircraft at a second point different than the first point; and
    splitting the modular aircraft into two or more smaller modular aircrafts;
    wherein each smaller modular aircraft has no more than one of the attached payloads.

4. The method of claim 2 further comprising:
    remotely piloting the modular aircraft to a target site; and employing an end effector at the target site;
wherein:
  the first payload comprises the end effector; and
  the end effector is selected from the group consisting of an RGB camera, a hyperspectral camera, an infrared camera, a gas detector, a pellet spreader, a cargo container, a passenger transport pod, a LIDAR sensor, an ultrasonic sensor, a sprayer, a grasper, and a bucket.

5. The method of claim 1 further comprising:
arranging four of the aircraft modules in a tetrahedral configuration.

6. The method of claim 1 further comprising:
arranging all of the aircraft modules in a flat configuration.

* * * * *